(12) United States Patent
Wetzler et al.

(10) Patent No.: US 10,989,800 B2
(45) Date of Patent: Apr. 27, 2021

(54) TRACKING USING ENCODED BEACONS

(71) Applicant: TECHNION RESEARCH & DEVELOPMENT FOUNDATION LIMITED, Haifa (IL)

(72) Inventors: Aaron Wetzler, Rishon LeTsiyon (IL); Ron Kimmel, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 488 days.

(21) Appl. No.: 15/817,811

(22) Filed: Nov. 20, 2017

(65) Prior Publication Data

US 2018/0143313 A1 May 24, 2018

(30) Foreign Application Priority Data

Nov. 22, 2016 (IL) .......................................... 249140

(51) Int. Cl.
*G01S 13/10* (2006.01)
*G01S 5/16* (2006.01)

(52) U.S. Cl.
CPC .............. *G01S 13/106* (2013.01); *G01S 5/16* (2013.01); *G01S 5/163* (2013.01)

(58) Field of Classification Search
CPC ........... G01S 13/106; G01S 5/163; G01S 5/16
USPC ............ 342/90, 450, 125, 36, 465, 108, 115
See application file for complete search history.

(56) References Cited

U.S. PATENT DOCUMENTS

| 7,729,515 | B2 | 6/2010 | Mandella et al. |
| 2007/0211239 | A1* | 9/2007 | Mandella .............. G06F 3/0423 356/138 |
| 2014/0160250 | A1 | 6/2014 | Pomerantz et al. |

OTHER PUBLICATIONS

Mautz, Rainer. Indoor Positioning Technologies. ETH Zurich, Department of Civil, Environmental and Geomatic Engineering, Institute of Geodesy and Photogrammetry, Feb. 2012.
Light List. vol. I. Atlantic Coast. St. Croix River, Maine to Shrewsbury River, New Jersey, 2017.
J. Borenstein, H.R. Everett, L. Feng: "Where am I? Sensors and methods for mobile robot positioning", Chapter 6: Active Beacon Navigation Systems. Technical Report, University of Michigan, pp. 151-172, Apr. 1996.
J. Pearson: "Comma-free codes" Proc. 3rd Int. Wshop on Symmetry in Constraint Satisfaction Problems, pp. 161-167, 2003.
Bron and J. Kerbosch: "Algorithm 457: finding all cliques of an undirected graph" Communications of the ACM, vol. 16, No. 9, pp. 575-577, Sep. 1973.

* cited by examiner

*Primary Examiner* — Bo Fan
(74) *Attorney, Agent, or Firm* — The Roy Gross Law Firm, LLC; Roy Gross

(57) ABSTRACT

A tracking system, comprising: multiple beacons, each associated with a different cyclic equivalence class of code-word length n, and each configured to broadcast a bit-stream comprising a repeating code-word, where the code-word belongs to the associated cyclic equivalence class; and a mobile tracking unit, comprising: a sensor, and a processor, wherein the sensor is configured to simultaneously detects at least some of the bit streams, and provide each sensed bit stream in real-time to the processor, wherein for each bit-stream received by the processor from the sensor, the processor is configured to identify the beacon that broadcasted the bit-stream using the first n received bits.

19 Claims, 12 Drawing Sheets

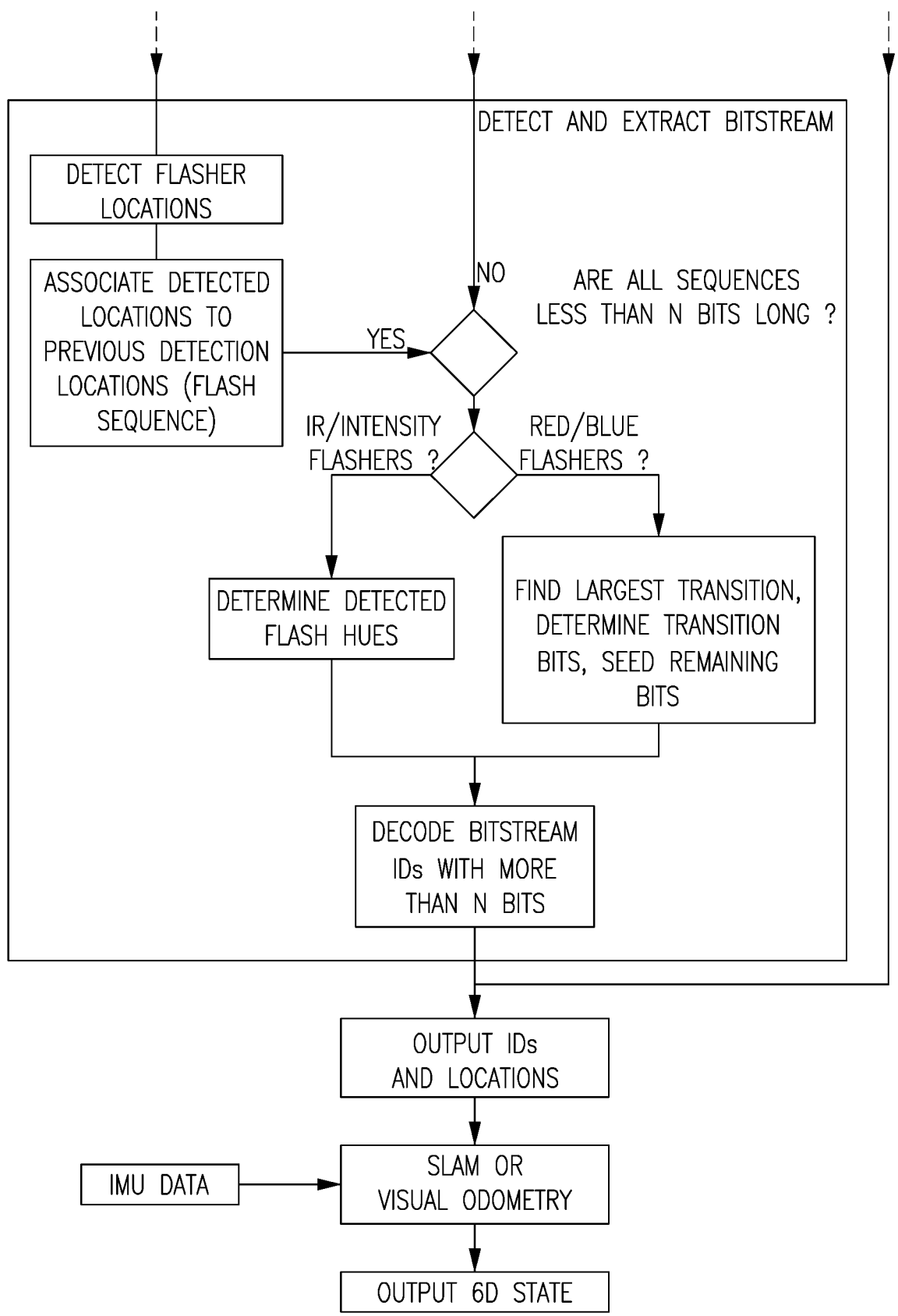
FIG.5 (cont. 1)

TRACKING USING ENCODED BEACONS

CROSS REFERENCE TO RELATED APPLICATIONS

This application claims the benefit of priority of Israel Patent Application No. 249140, filed Nov. 22, 2016, entitled "Tracking Using Encoded Beacons". The contents of the above are all incorporated by reference as if fully set forth herein in their entirety.

BACKGROUND

Real-time, multi-dimensional spatial and/or orientation tracking with centimeter or millimeter-level accuracy, is useful for many types of applications, including but not limited to Virtual Reality/Augmented Reality applications, robotic navigation, and autonomous vehicle navigation.

Typical tracking solutions include using position sensors, such as GPS (Global Positioning System), time of flight/arrival radio positioning, magnetic field sensing, optical tracking systems and camera localization systems involving marker tracking and SLAM (simultaneous localization and mapping). Each of these has their advantages and disadvantages for different use case scenarios, which are briefly discussed, as follows:

GPS is generally only accurate to a few meters and is typically not effective indoors.

Magnetic field sensing, although quite accurate, may be susceptible to interference, has a practical range of only a few meters, and typically requires strong magnetic fields which are not always suitable.

External optical tracking systems require tethering multiple synchronized cameras to a host computer, collating all the computation onto a single computing station, and defining the number of tracked objects in advance. Furthermore, increasing coverage requires adding more cameras, which may add significantly to the overall cost. Since even small deviations in the orientation of the tracking cameras, such as may be caused by temperature variations, vibrations, or accidental bumps can cause significant errors in localization, system calibration for optical tracking systems typically needs to be performed before almost every use.

Time of flight (TOF), Time of arrival (TOA) radio systems use Ultra-Wide Bandwidth transmissions at low power to obtain a typical 10 centimeters (cm) positional accuracy at 500-900 MHz. However, improving the tracking to centimeter-level accuracy requires an order of magnitude increase in operational frequency with highly specialized hardware and radio spectrum licensing.

SLAM systems use commodity visible/near visible digital sensors coupled with processing units that detect, recognize and track image points in the camera stream from the point of view of the moving object to extract position and orientation information while mapping out the scanning environment. Although these systems are cheap, fast and make use of readily available camera technologies, SLAM systems suffer from issues of drift as well as sensitivity to lighting variation, such as shadows and changing brightness, irrespective of improvements to on-board camera resolution, speed, and inertial sensor precision.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a tracking system, comprising: multiple beacons, each associated with a different cyclic equivalence class of code-word length n, and each configured to broadcast a bit-stream comprising a repeating code-word, wherein the code-word belongs to the associated cyclic equivalence class; and a mobile tracking unit comprising: a detector, and a processor, wherein the detector is configured to simultaneously detect at least some of the bit streams, and provide each sensed bit stream in real-time to the processor, wherein for each bit-stream received by the processor, the processor is configured to identify the beacon that broadcasted the bit-stream using the first n received bits.

In some embodiments, the multiple beacons do not share a clock signal.

In some embodiments, the processor is further configured to determine any of a spatial position and an orientation of the tracking unit using a known position of each identified beacon.

In some embodiments, the processor is further configured to determine six degrees of freedom of the spatial position and the orientation of the tracking unit when the detector detects at least four non-coplanar bit-streams.

In some embodiments, the processor is further configured to determine multiple spatial positions and orientations over time, thereby tracking the tracker.

In some embodiments, the system further comprises a simultaneous localization and mapping (SLAM) system, wherein any of the determined spatial positions and orientations are used to augment the SLAM system and provide drift-free tracking of the tracking unit.

In some embodiments, the cyclic code is robust to any of a bit insertion error, a single bit deletion error, and up to two bit-flip errors.

In some embodiments, the cyclic code is a binary code.

In some embodiments, the beacons are configured to emit multiple hues, wherein each value of the bits of the bit streams is represented by one of the multiple hues, and wherein the sensor is a hue-sensitive camera.

In some embodiments, the beacons are configured to emit multiple intensities, wherein each value of the bits of the bit streams is represented by one of the multiple intensities, and wherein the sensor is an intensity-sensitive camera.

In some embodiments, the number of beacons is at least linearly proportional to the code-word length.

In some embodiments, the system further comprises a synchronizing unit configured to emit a clock alignment signal, wherein each of the tracking unit and the multiple beacons are configured to detect the clock alignment signal and use the detected clock alignment signal to synchronize an internal clock provided with each of the tracking unit and each beacon, thereby synchronizing the internal clocks of the tracking unit and the multiple beacons.

In some embodiments, each beacon is further configured to use the clock alignment signal to determine when to continue operation and when to enter a sleep mode.

In some embodiments, the detector is configured to simultaneously detect the bit-streams by receiving a stream of multiple two-dimensional images, identifying the brightest image points in a subsequently captured image of the stream of images, and matching the brightest image points to similar brightest points identified in a previously captured image of the stream of images, wherein a series of matched image points corresponds to one of the detected the bit-streams.

Another embodiment relates to a method for identifying multiple signal sources, comprising: receiving a code-word length n; generating the n-bit cyclic equivalence classes for the code-word length; associating each equivalence class with a different identifier, thereby associating each code-word of each cyclic equivalence class with the associated identifier; and assigning each identifier to a different signal source configured to emit an identifying bit-stream belonging to the cyclic equivalence class associated with the assigned identifier.

In some embodiments, associating each equivalence class with the different identifier comprises associating the non-trivial equivalence classes with the different identifier.

In some embodiments, the method further comprises adding at least one noisy variant to each cyclic equivalence class.

In some embodiments, the noisy variant corresponds to a bit insertion error.

In some embodiments, the noisy variant corresponds to a bit deletion error.

In some embodiments, the noisy variant corresponds to one or more bit flip errors.

In some embodiments, each signal source is configured to emit the bit-stream using a hue-based encoding scheme.

In some embodiments, each signal source is configured to emit the bit-stream using an intensity-based encoding scheme.

In some embodiments, the method further comprises synchronizing each of the signal sources using a clock alignment signal.

A further embodiment relates to a tracking method, comprising: simultaneously detecting a bit-stream from each of at least three different signal sources, wherein each bit-stream is a repeating code-word of length n, wherein each code-word belongs to a different cyclic equivalence class associated with its signal source; identifying each source in real-time using the first received n bits of each bit-stream; and using a known position of each of the at least three identified signal sources to track any of a position and orientation.

In some embodiments, each cyclic equivalence class includes at least one noisy variant code-word.

In some embodiments, the noisy variant code-word corresponds to a bit insertion error.

In some embodiments, the noisy variant code-word corresponds to a bit deletion error.

In some embodiments, the noisy variant code-word corresponds to one or more bit flip errors.

In some embodiments, the bit-streams are encoded using a hue-based encoding scheme.

In some embodiments, the bit-streams are encoded using an intensity-based encoding scheme.

In some embodiments, the at least three different sources are synchronized.

In some embodiments, the at least three different sources are not synchronized.

In some embodiments, the method further comprises determining the known positions of the signal sources in an initial calibration and mapping stage.

In some embodiments, simultaneously detecting the bit-streams comprises receiving a stream of multiple two-dimensional images, identifying the brightest image points in a subsequently captured image of the stream of images, and matching the brightest image points to similar brightest points identified in a previously captured image of the stream of images, wherein a series of matched image points corresponds to one of the detected bit-streams.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a system to provide real-time location and orientation tracking. The system includes multiple active stationary beacons capable of broadcasting signals at high speed, and a single or multiple mobile tracking unit(s) each provided with a detector, such as a camera, and a processor. Each beacon is assigned a unique identifier (ID) associated with a different cyclic equivalence class of code-word length n, and broadcasts an identifying bit-stream comprising a repeating code-word belonging to its equivalence class. At any given position and/or orientation, the tracking unit may be within range of at least some of the beacons, allowing the detector to simultaneously detect at least some of the bit-streams, and provide them to the processor in real-time. Being cyclic codes, for each received bit-stream, the processor may identify the beacon that broadcasted that bit-stream using the first n received bits, irregardless of phase. This allows the processor to identify the beacons within a single code cycle without requiring clock synchronization between the beacons and tracking unit, and without requiring the detection of a delimiting bit-sequence. The processor may then use known positions of the identified beacons, determined in an initial mapping/calibration stage, to determine the spatial position and/or orientation of the tracking unit in real-time. Repeating this over time, the processor may determine multiple locations and/or orientations and track the mobile tracking unit. Thus the lock-on time for tracking may be close to a single code cycle, or the time to receive the first n bits.

The novel encoding and decoding for the identifiers allows identifying the beacons within a single cycle, without requiring a shared clock signal. To determine the location and orientation in three-dimensions (3D), at least four beacons may be positioned within sensing range of the tracking unit in a non-planar setup, providing information relating to a total of 6 degrees of freedom (6D). This system may overcome limitations of current spatial localization systems, and may be used in a stand-alone capacity or to augment simultaneous localization and mapping (SLAM) systems to provide drift free tracking of the tracking unit.

Figure 1:
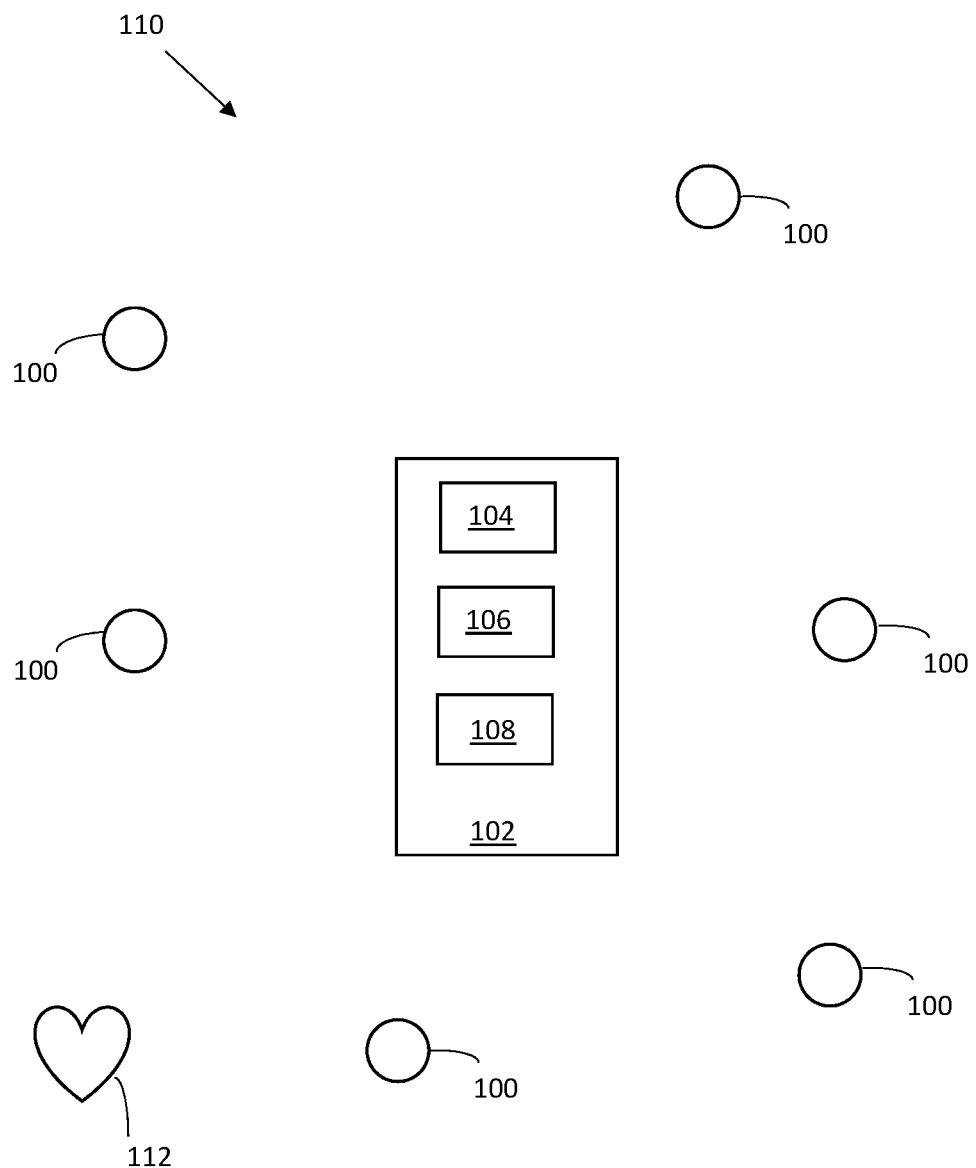
FIG. 1 shows a system for real-time location and orientation tracking, in accordance with an embodiment.

Referring to FIG. 1, an illustration of a real-time tracking system 100 is shown, in accordance with an embodiment. System 110 may include multiple independent, stationary beacons 100 positioned in an environment, and a mobile tracking unit 102 positioned within sensing range of beacons 100. Tracking unit 102 may include a detector 104, such as a camera, at least one processor 106, and a memory unit 108 for storing the mapped position of beacons 100. Beacons 100 may use visible or near visible illumination sources connected to a power source and electronic control circuit. Each beacon 100 may broadcast a unique cyclic code, described in greater detail below.

Figure 2:
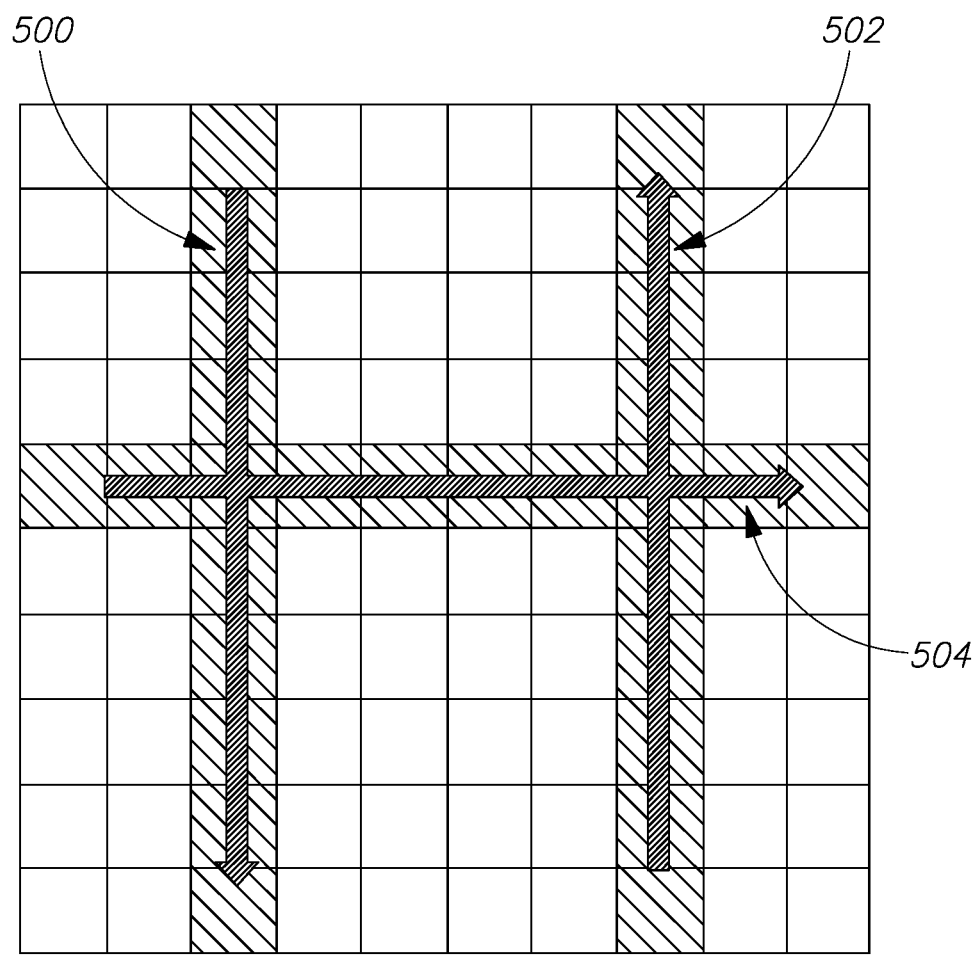
FIG. 2 shows a 10×10 pixel grid of a camera sensor, in accordance with an embodiment.

Camera 104 may include multiple complementary metal oxide semiconductor (CMOS) rolling shutter sensors, or charged coupled device (CCD) global shutter sensors. Referring to FIG. 2, an exemplary sampling scenario for both CCD and CMOS sensors is illustrated with a 10×10 sensor array and three different types of beacon motion. The black arrows illustrate three different relative directions of motion that may be observed by camera 104 between tracking unit 102 and beacons 100. Arrow 500 represents a beacon 100 which is observed by camera 104 as moving from the first (top) row of pixels to the last (bottom) row of pixels of the sensor array. Arrow 502 represents a beacon 100 which is observed by camera 104 as moving from the last (bottom) row of pixels to the first (top) row of pixels of the sensor array. Arrow 504 represents a beacon 100 which is observed by camera 104 as moving from the leftmost pixel column to the rightmost pixel column. It may be appreciated that the beacon motion observed by camera 104 results from the motion of tracking unit 102 relative to the stationary beacons 100. Each motion type has a different impact on the beacon detection errors that may occur when using either CMOS or CCD sensors To maximize frame rates, CMOS and CCD rolling shutter sensors expose each sensor row sequentially in time. The sensor data for every pixel bin is read, converted to a digital signal via the row's analog-to-digital (A/D) converter, and stored in a line buffer. Line buffer read-outs may overlap with the sensing of the subsequent row sensing, allowing for a high frame rate. The sample period for each row may be fixed and determined by the total row readout time and the chosen exposure duration.

Figure 3:
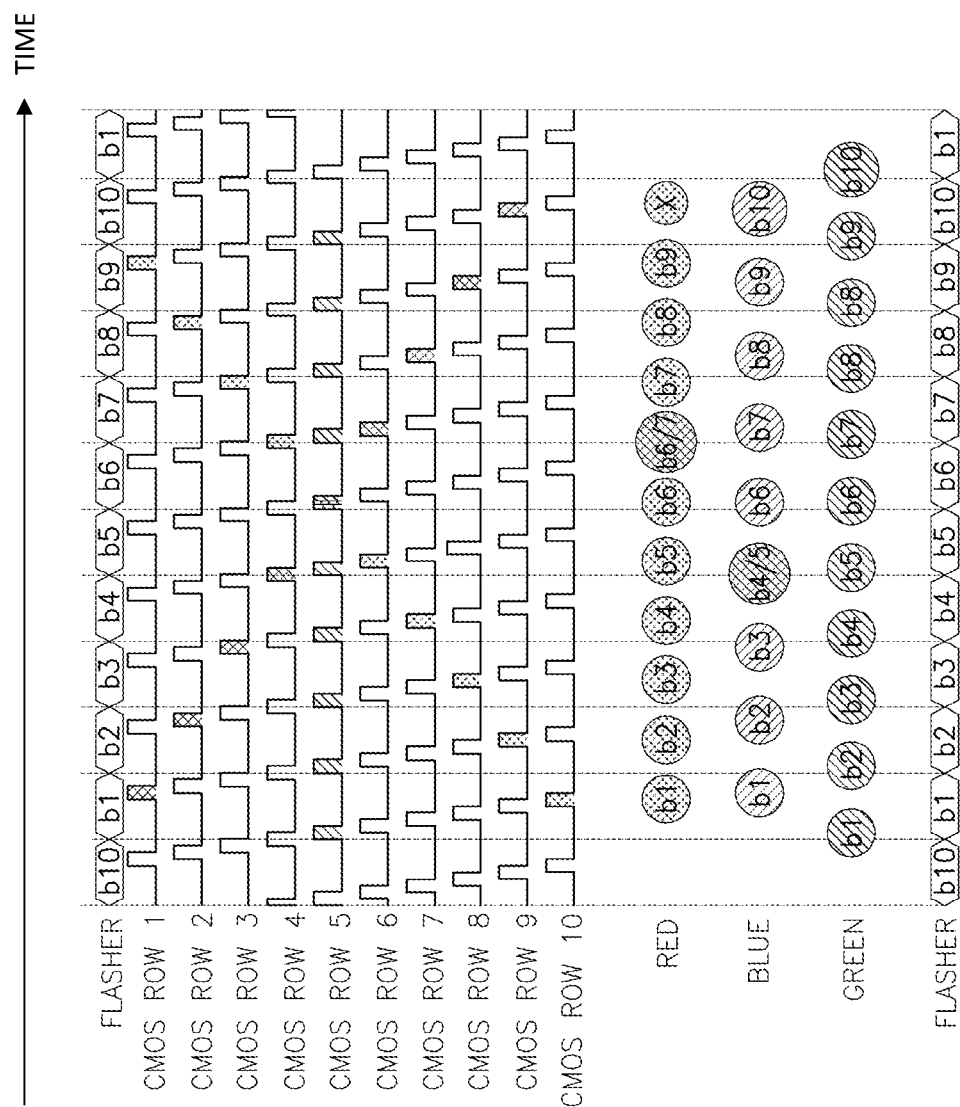
FIG. 3 shows motion sampling by a complementary metal oxide semiconductor (CMOS) sensor, in accordance with an embodiment.

Reference is now made to FIG. 3, which illustrates the motion sampling by a 10×10 complementary metal oxide semiconductor (CMOS) sensor, in accordance with an exemplary embodiment. A disadvantage with CMOS rolling shutters is that each row represents a sample of the scene at a slightly different point in time. As a result, world points projected onto different sensor rows between frame captures may be sampled with a period that will shorten or expand as the projection moves down or up the rows respectively, resulting in bit-drift. Rows 1 to 10 show the exposure timing pulses for each row in the 10×10 CMOS sensor. The horizontal axis represents time. The top and bottom row indicate the bits broadcast by a beacon, under the assumption that the clocks of the beacon and the CMOS sensor are identical. In spite of the perfect synchronization, the Red and Blue rows in the diagram indicate that a bit-drift error will occur as a result of crossing over to different rows sampled sequentially in rolling shutter mode.

Figure 4:
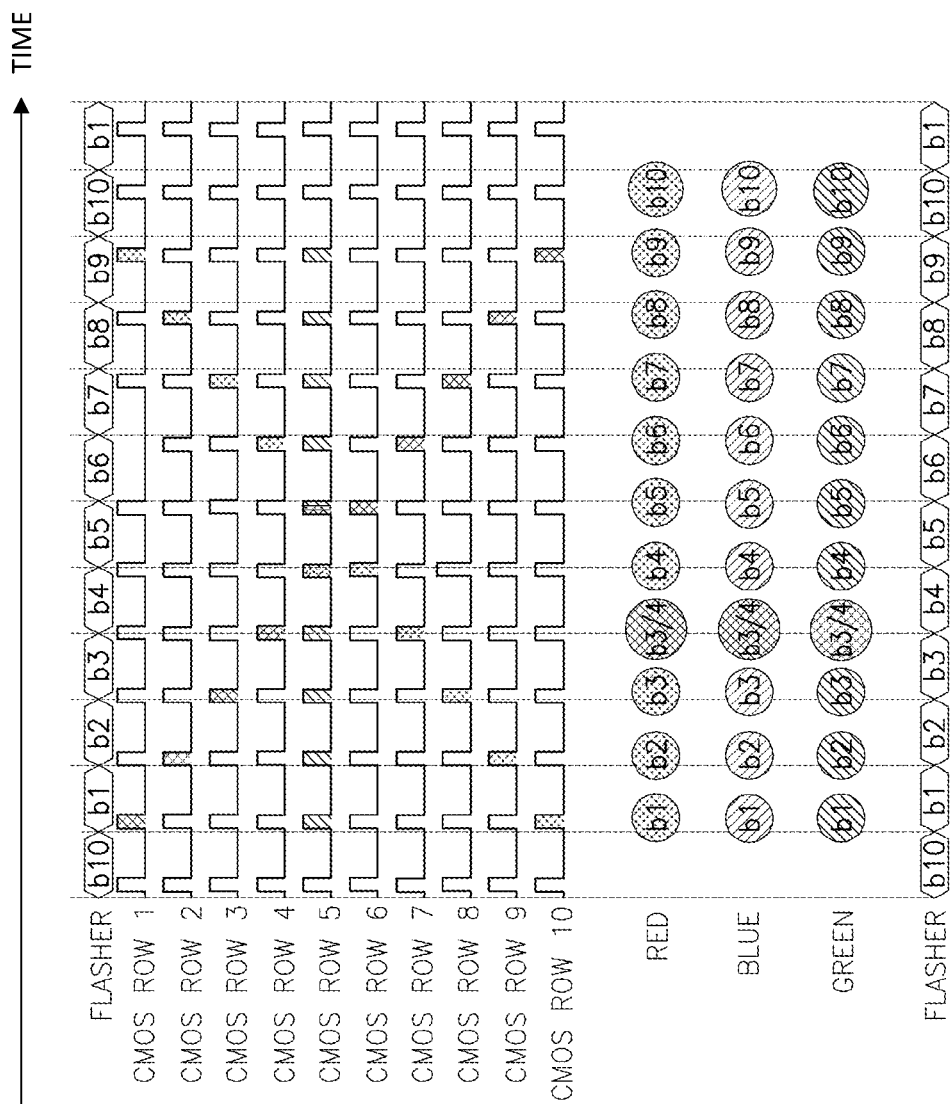
FIG. 4 shows motion sampling by a charged coupled device (CCD) sensor, in accordance with an embodiment.

Reference is now made to FIG. 4, which illustrates the motion sampling by a 10×10 charged coupled device (CCD) sensor, in accordance with an embodiment. In contrast to CMOS based cameras, CCD sensors expose all the sensor rows simultaneously, and read out the rows after exposure is complete. This results in a fully synchronized exposure of all pixels which in turn results in significantly reduced motion artifacts. The sensor sampling period for every observed world point is identical and bit-drift errors do not occur as a result of scene or camera motion. However, there is still a susceptibility to errors resulting from clock drift.

Rows 1 to 10 of FIG. 4 show the exposure timing pulses for each row in the 10×10 CCD sensor. This sensor exposes all of the pixels in the whole image simultaneously, such that the motion of each beacon across the rows has no impact on the sampling time. However, in this example the clock of camera 104 is 5% slower than the clocks of beacons 100, resulting in a bit-drift error. The Red, Blue and Green rows show that any Flasher motion across the sensor will have the same error that is a result of clock timing differences.

Camera 104 may be provided with a wide angle lens to obtain a field of view of 90 degrees or more in order to detect as many beacons as possible per sensor frame. However, there is an engineering trade-off between having a large field of view and retaining detection reliability and repeatability at larger distances between any of beacons 100 and camera 104. A narrow field of view may accommodate a higher detection accuracy, with the trade-off that a motion by camera 104 may cause beacons 100 to leave the visible frame quickly, resulting in frequent tracking loss. On the other hand, a wide field of view may reduce the size and brightness of the detected points on the image sensor, thereby making detection and localization more challenging. Increasing the framerate may improve detection, however this may incur an additional computational cost. Thus, to improve visibility, beacons 100 may include any of the following types of emitters: 1) high intensity, lens concentrated light emitting diodes (LEDs), and 2) highly diffuse LED packages.

For high intensity, lens concentrated LEDs, it is possible to reduce the sensor exposure to low levels, for example less than 1/2000s at 120 frames per second (fps) frame-rate. Provided the LEDs output has sufficient power, it is then relatively straightforward to accurately detect very bright, small, concentrated LED point locations when combined with local non-maximum suppression. These may produce false positives detections in the image however such errors may be included in a robust beacon code-book, which will be described in greater detail below. This scenario does not typically enable SLAM tracking in the primary Tracker sensor and a secondary camera may be needed if natural feature based SLAM is to also be performed.

Highly diffuse LED packages may be used when the exposure needs to be close to the frame-rate of the camera, such as for natural feature based SLAM. This may result in numerous bright areas in the image, as is typical for a SLAM tracking scenario. Thus one cannot rely on only detecting bright spots, and beacons 100 must project each flash onto multiple neighboring pixels, to reliably detect the locations, hues and intensities of beacons 100. To enable maximum visibility, the illuminated surface of a beacon may be covered with a light diffusing material, and may be large enough to subtend a sufficient angle onto sensor 104 to cover enough pixels for a detection. Large tracking environments may require either greater sensor resolution or large beacon illumination surfaces.

Initially, beacons 100 may be calibrated and mapped with respect to a global coordinate frame using known techniques. The position of beacons 100 may be determined using any suitable method, such as by: 1) measuring their position in the environment using suitable measurement equipment, 2) positioning beacons 100 on a structure with known geometry, such as a room in a building which has available architectural information or has been previously measured. Optionally, mobile tracking unit 102 may automatically determine the absolute positions of beacons 100 by detecting the locations of natural image features and beacons 100 in a sequence of frames observed by the camera 104 while mobile tracking unit 102 moves around the environment in a looped trajectory, starting and stopping at the same point. These two-dimensional (2D) image locations may then be used in standard 2D to 3D processing pipelines in which a global bundle adjustment process minimizes the re-projection errors. The known locations of detected points in the image frame may then be converted into a common world coordinate frame. However, this may yield a scale ambiguity. To overcome this, a specially designed beacon pair may be used, where the distance between the beacon pair is known. The world coordinates of every observed beacon 100 may then be determined. The calibration and absolute position mapping may be repeated if any of beacons 100 are repositioned.

Once mapping is complete, system 110 may enter a Detection-Tracking loop. Tracking unit 102 may receive the mapping and calibration information from beacons 100 and store this information in memory unit 108. Tracking unit 102 may capture one or more frames of beacons 100 using camera 104. The frames may be processed to detect the 2D image locations of beacons 100. Detection may be performed by searching each captured frame for the brightest image points, associating these points to similar points in a previously captured frame, and identifying the beacon 100 based on the detected sequence, which will be described in greater detail below. Camera 104's sensitivity to exposure may be tuned accordingly to improve detection rates. Each identifier for each beacon 100 may be stored with the beacon's 2D pixel location at the memory unit 108 of the tracking unit 102, and may be broadcast using any wireless technology, such as WiFi or Bluetooth, to nearby devices for further processing. Alternatively, tracking unit 102 may be directly coupled to an additional processing unit which performs further processing using the locations provided by the Detection-Tracking loop.

Figure 5:
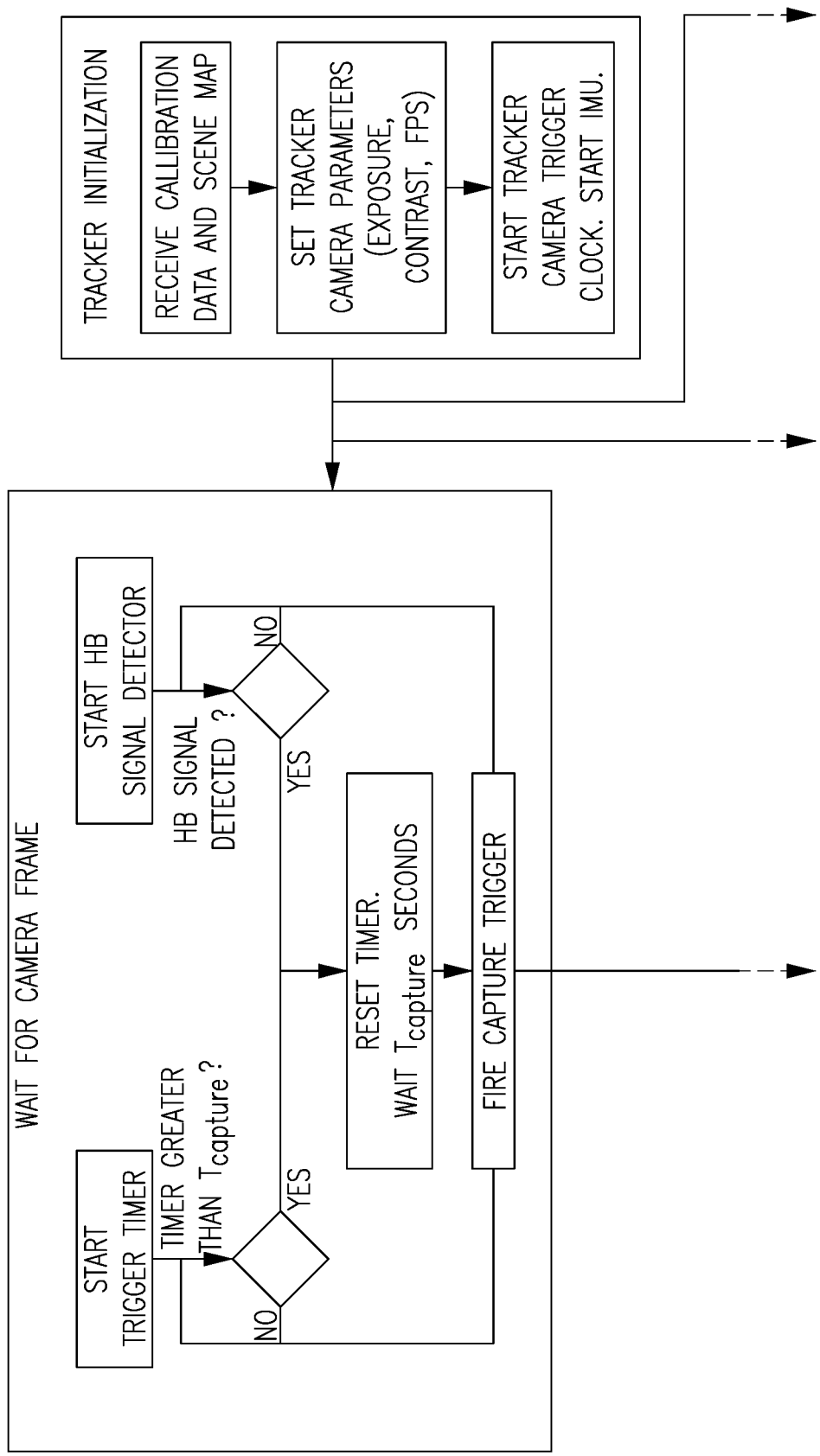
FIG. 5 shows a flow diagram for a tracking and detection pipeline, in accordance with an embodiment.

If four or more beacons 100 are correctly identified in one captured frame, these may be used to determine the tracking unit's 102 full 6 degrees of freedom, providing beacons 100 are not co-planar. If three or fewer beacons 100 are detected, and/or any of the detected beacons 100 are co-planar, then the degrees of freedom of tracking unit 102 may still be fully or partially determined based on a-priori scene information, for example based on knowledge that tracking unit 102 only moves on a 2D surface, or that processor 106 makes temporal consistency assumptions. Alternatively, a standard SLAM system may be augmented using detected locations of beacons 100 as known fixed reference points. The predictions made by tracking unit 102 based on locations of beacons 100 may also be improved by combining data from additional sensors, such as by using an Inertial Measurement Unit (IMU) attached to tracking unit 102. This may be performed using a Kalman Filter or an Extended Kalman Filter or any other reasonable approach to combining measurement predictions. FIG. 5 illustrates the whole pipeline of this process.

Each of beacons 100 may repeatedly broadcast a bit-stream comprising an identifying cyclic code of n bits. The code length n may be uniform for all the beacons 100. The codes may allow identifying each beacon 100 using the first n sensed bits, irregardless of the phase shift of the first sensed bit within the cycle. As a result, the lock-on time to decode the sensed codes and track the tracking unit 102 may be close to a single cycle of length n, without requiring synchronization between the beacons 100, or waiting to sense a delimiting bit sequence.

A description of an exemplary robust cyclic binary code for unique identity detection now follows: Each beacon 100 may continuously pulse the next bit of its unique cyclic binary code. Typically, identifying coded pulses requires detecting a complete code-word before decoding. If the first sensed bit is not the first bit of the code-word, typical tracking units operating with unsynchronized beacons must wait until a delimiting bit sequence indicating the first portion of a code-word is detected for each beacon, resulting in an additional latency of as much as n−1 emitted pulses for a code-word of length n, i.e. if there is a phase shift of 1 bit for any of the beacons, and a lock-in time of nearly two cycles.

In contrast to this, the proposed coding system allows decoding after detecting only a single sample of every bit of the code-word, irregardless of the phase shift, allowing to identify any given beacon after a single cycle, even when the tracking unit's sampling clock is not synchronized with the beacon's emission clock.

The code-words are designed to have three properties, making them useful in an automated detection and decoding pipeline: 1) fast lock-on and decoding time that is close to a single full code cycle, 2) robustness to single bit-shift and bit-flip errors, and 3) code-book size, and thus the number of beacons, is at least linearly proportional to the code-word length. It may be appreciated that realizing any one or two of these properties without the other(s) is considerably simpler than realizing all three together.

To design a code-book with code-words that can be detected within one full code cycle without requiring a synchronization comma or delimiter, the set C of complete cyclic equivalence classes using n-bit binary codes, such as described in J. Pearson, 'Comma-free codes. Proc. 3rd Int. Wshop on Symmetry in Constraint Satisfaction Problems, pages 161-167, 2003, is initially selected. A cyclic equivalence class $C_n$ is defined as the set of the n cyclic shifts of the n-bit sequence $(b_1, b_2, \ldots, b_n)$, and every element $c \in C_n$ has the property that if $(b_1, b_2, \ldots, b_n) \in C_n$, then $(b_i, b_{i+1}, \ldots, b_n, b_1, \ldots, b_{i-1}) \in c, \forall i \in \{1 \ldots n\}$, and $c_i$ is denoted as the code-word c having a cyclic shift, or phase shift, of i bits.

These codes may be useful because each beacon repeatedly broadcasts its code-word c, selected as any one of the elements $c \in C_n$. Thus, in an error-free environment, tracker unit 102 can decode the code-word on receiving at least n bits from a beacon 100, irrespective of the position of the first detected bit in the code-word bit stream, precluding the need to wait for the first bit of the code-word.

Optionally, trivial cyclic codes such as (00 . . . 0) and (11 . . . 1) may be ignored. An example of an element in $C_4$ is the set c={(0001), (0010), (0100), (1000)}, where $c_0$ is defined as the smallest number in c, and is used to represent c. The other elements $c_i$ of c can be obtained by performing cyclic bit-shifting of $c_0$, and the decimal value of $c_0$ may be a representative identifier. The total number of codes available in $C_n$ is given by Integer Sequence A000031, having an exponential code-word length.

To create the code-book $C_n$, all the complete cyclic equivalence classes are identified. A list of the representative code-word $c_0$ for each equivalence class is stored with a different beacon identifier idx. Additionally, a lookup table $D_n$ is created that stores every possible n-bit sequence with its corresponding $c_0$ code-word from which it may be generated. The following algorithm, PROCEDURE 1, illustrates a method for generating $C_n$ and $D_n$:

| PROCEDURE 1: Generating all n-bit cyclic equivalence classes | | |
|---|---|---|
| Input: n | | (n code-bits) |
| Output $D_n$, $C_n$ | | (look-up table, code-book) |
| 1. | $D_n \leftarrow$ ZEROS (1, $2^n$) | (look-up table) |
| 2. | c ← ∅ | (code-book) |
| 3. | k ← 0 | (code counter, identifier) |
| 4. | For each $c_0 \in (0, \ldots, 2^n - 1)$ do | ($c_0$ is decimal) |
| 5. | inC ← false | |
| 6. | $\hat{c} \leftarrow$ DEC2BIN($c_0$, n) | ($\hat{c}$ is n-bit binary) |
| 7. | Idx ← ZEROS(1, n) | (look-up table indices) |
| 8. | For each i ∈ (0, ..., n − 1) do | |
| 9. | $\hat{c}_i \leftarrow$ CYCLICSHIFT($\hat{c}$, i) | |
| 10. | Idx(i) ← BIN2DEC($\hat{c}_i$) | (index into $D_n$) |
| 11. | inC ← (inC)∧($D_n$(Idx(i) + 1) > 0) | |
| 12. | If ¬inC then | (if $c_0$ not in $C_n$) |
| 13. | k ← k + 1 | (increase code counter) |
| 14. | $C_n \leftarrow \{C_n, c_0\}$ | (add $c_0$ to code-book) |
| 15. | For each i ∈ (0, ..., n) do | (for all $c_i$...) |
| 16. | $D_n$(Idx(i)) ← k | (stores k in $D_n$) |

Each beacon 100 is assigned an identifier idx, selected from 0 to $|C_n|-1$. The identifier is encoded by using it as an index into the code-book and retrieving its corresponding $c_0$. Referring to Table 1 below which shows an exemplary code-book for 4-bit code-words, the identifier idx=1 is stored in association with the representative code-word $c_0$=0001, idx=2 is stored in association with $c_0$=0011, idx=3 is stored in association with $c_0$=0101, and idx=4 is stored in association with $c_0$=0111. On assigning an identifier idx to one of beacons 100, the identifier is used as an index into $C_n$, and its corresponding representative code-word $c_0$ is retrieved and transferred to the beacon 100 associated with that idx. The beacon then repeatedly broadcasts its code-word $c_0$ as a bit-stream at a known bit rate. Referring to the example below, the beacon having an idx of 1 repeatedly broadcasts the bit-stream 0001, the beacon having an idx of 2 repeatedly broadcasts the bit-stream 0011, etc.

TABLE 1

| $C_4$ code-book, associating each index with its $c_0$ code-word | | | | |
|---|---|---|---|---|
| $c_0$ | 0001 | 0011 | 0101 | 0111 |
| idx | 1 | 2 | 3 | 4 |

The following algorithm, PROCEDURE 2, illustrates encoding a beacon's assigned identifier idx to a representative code-word, $c_0$:

| PROCEDURE 2: Encode ID | |
|---|---|
| Input: $C_n$, idx | (code-book, code number) |
| Output: $c_0$ | |
| 1. $c_0 \leftarrow C_n$(idx) | |
| End | |

Table 2 below shows a lookup table $D_4$ corresponding to the code-book $C_4$ of Table 1, listing each code-word of a cyclic equivalence class with its corresponding idx. Thus the cyclically equivalent code-words 0001, 0010, 0100, and 1000 are each stored with the idx 1, the cyclically equivalent code-words 0011, 0110, 1100, and 1001 are each stored with the idx 2, etc.

TABLE 2

| $D_4$ look-up table, no error correction | |
|---|---|
| code | idx |
| 0000 | 0 |
| 0001 | 1 |
| 0010 | 1 |
| 0011 | 2 |
| 0100 | 1 |
| 0101 | 3 |
| 0110 | 2 |
| 0111 | 4 |
| 1000 | 1 |
| 1001 | 2 |
| 1010 | 3 |
| 1011 | 4 |
| 1100 | 2 |
| 1101 | 4 |
| 1110 | 4 |
| 1111 | 0 |

Once tracking unit 102 has detected a code-word of at least n bits from a beacon 100, the detected code-word is decoded using the lookup table $D_4$. Lookup table $D_4$ lists every possible n-bit code-word in association with its idx, allowing the detected code-word to be used as an index for the look-up table. For example, a sequentially received bit sequence of 1101110111 may be processed as each new bit comes in, and may be stored as (• • • 1), (• • 11), (• 111), (0111), (1011), (1101), (0111) and so on where • represents unknown data. Looking up each of these code-words in Table 2, the resulting decoding stream is • • • 4 4 4 4 and so on. If 0 is retrieved as the identifier then the detected bit sequence is considered to be unknown.

It may be appreciated that in the example above, only 4 bits were required until the decoder could lock-on and determine the identifier. Furthermore, decoding by referencing the code-word in the look-up table may be performed efficiently and quickly by ensuring that memory unit 108 of tracking unit 102 is quickly accessible, and/or by implementing the look-table in hardware. The following algorithm, PROCEDURE 3 illustrates the decoding scheme:

| PROCEDURE 3 | |
|---|---|
| Input: $D_n$, $c_i$ | (look-up table, binary sequence) |
| Output: $c_0$ | |
| 1. idx←BIN2DEC($c_i$) | (convert the detected binary bit-stream to a decimal number) |
| 2. $c_0$←$D_n$(idx) − 1 | (use the decimal number as an index into the look-up table) |
| End. | |

A slightly modified encoding/decoding scheme is now described to allow for error correction and detection. Typical error correcting approaches encode bit sequences with parity bits, Hamming codes, CRC codes and others. These methods measure the distance between two code words using the Hamming metric and ensure a minimal Hamming distance between all code-words. The Hamming metric counts the number of different bits between two code-words. Unfortunately, this is only useful for bit transmission errors where a bit or sequences of bits are incorrectly received, and is insufficient when both bit-flips and bit-shift errors may occur. One error metric that may be used is the Levenshtein distance, or 'Edit' distance, such as described in V. I. Levenshtein. *Binary codes capable of correcting deletions, insertions and reversals. In Soviet physics doklady*, volume 10, page 707, 1966. This metric measures how many changes are required to turn one sequence into another, for example, a single insertion or deletion resulting from bit-drift would result in a Levenshtein distance of 1, and a bit flip, which is a chained insertion and then deletion (or vice-versa) has a Levenshtein distance of 2.

The following proposed error-robust encoding/decoding scheme does not allow for more than a single bit insertion or deletion error to occur per code, but does allow for one or more bit-flip errors. Thus, the Levenshtein distance is not used directly. Instead, to build a code-book based on insertion, deletion and bit-flip errors, all the code-words that can be reached by these permissible errors are enumerated for every complete cyclic primitive class, where two primitive classes overlap if an error in both map to the same code.

Solving for the maximal set of non-overlapping primitive classes using the Bron-Kerbosch algorithm, described in Bron and J. Kerbosch. *Algorithm 457: finding all cliques of an undirected graph. Communications of the ACM*, 16(9): 575-577, 1973 is NP-complete, and was found in experimentation to be unfeasible for n larger than 14.

Figure 6:
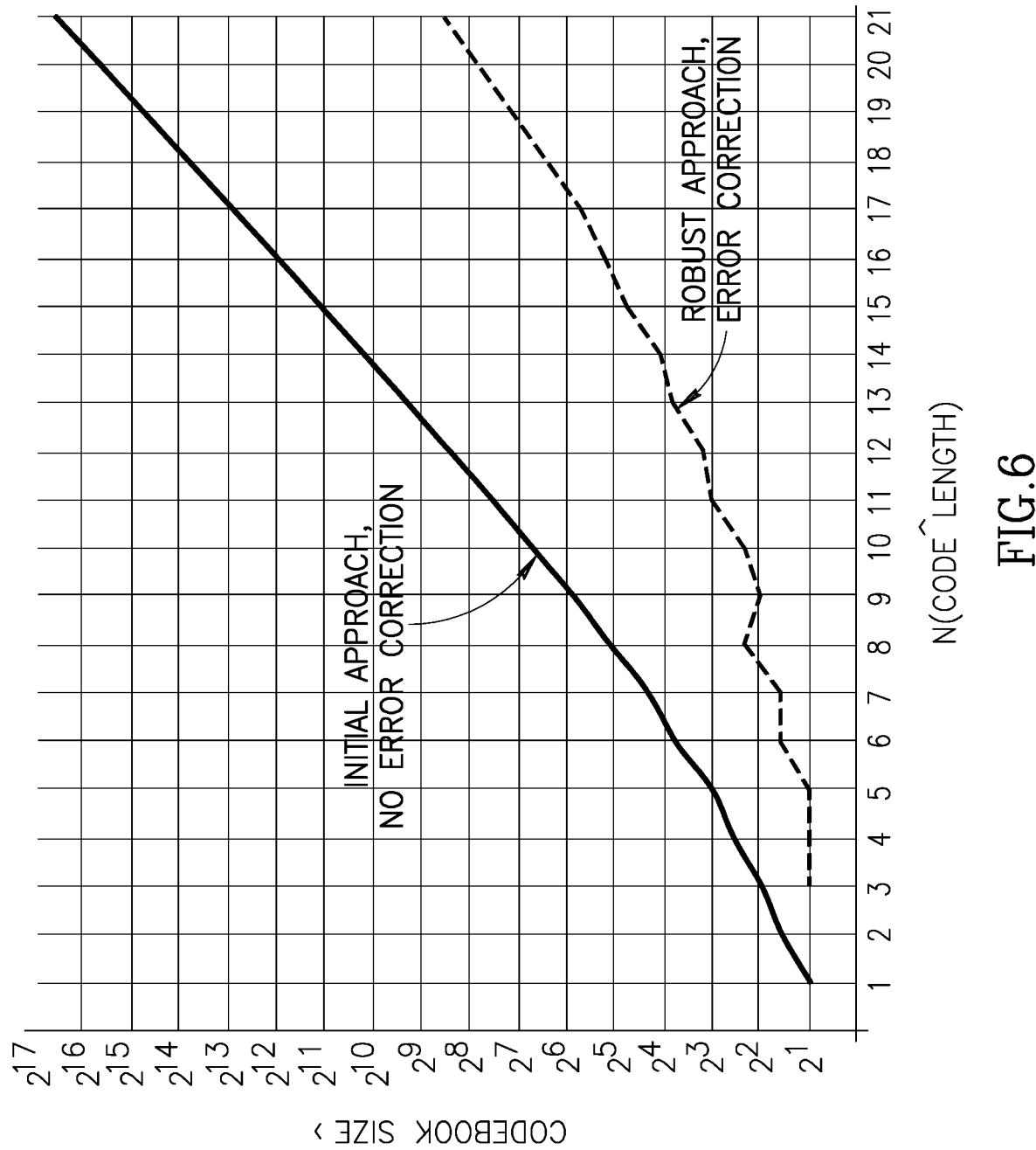
FIG. 6 shows a comparison of code-book sizes for different code-word lengths for two code-book generation methods.

However, a relatively simple greedy algorithm was found to be sufficient for producing a code-book having a size that is exponential to the number of bits in the code-words. This greedy algorithm is substantially similar to PROCEDURE 1 described above, with the notable difference of storing all the noise variants of all the cyclic variations in the look-up table, in addition to the original cyclic variations of c. In other words, for every $c_i$ the set of all possible single bit insertion, deletion and bit-flip errors are generated and stored in the look-up table with the same identifier as $c_0$. An exemplary implementation of this scheme is shown below in PROCEDURE 4. The code-books generated by this procedure can be seen in Appendix A, which is an integral part of this disclosure, and the number of codes produced for both this method and the non-robust initial method can be seen in FIG. 6.

| PROCEDURE 4 Generating robust n-bit cyclic equivalence classes | | |
|---|---|---|
| Input: n | | (n code bits) |
| Output: $D_n$, $C_n$ | | (look-up table, code-book) |
| 1. | $D_n$←ZEROS(1, $2^n$) | |
| 2. | $C_n$←∅ | |
| 3. | k ← 0 | |
| 4. | For each $c_0$ ∈ (0, ... , $2^n$ − 1) do | |
| 5. | inC←false | |
| 6. | ĉ ←DEC2BIN($c_0$, n) | (ĉ is n-bit binary) |
| 7. | Idx←ZEROS(1, n) | (look-up table indices) |
| 8. | For each i ∈ (0, ... , n − 1) do | |
| 9. | ĉ ←CYCLICSHIFT(ĉ, i) | |
| 10. | Idx(i)←BIN2DEC(ĉ) | (index into $D_n$) |
| 11. | V←NOISIFY(ĉ) | (insertions, deletions, flips) |
| 12. | For each v̂ ∈ V | |
| 13. | idx←BIN2DEC(v̂) | |
| 14. | Idx←{Idx, idx} | |
| 15. | inC←(inC)∧($D_n$(idx + 1) > 0) | |
| 16. | If ¬inC then | (if $c_0$ not in $C_n$) |
| 17. | k←k + 1 | (increase code counter) |
| 18. | $C_n$←{$C_n$, $c_0$} | (add $c_0$ to code-book) |
| 19. | For each idx ∈ Idx do | (for all noised $c_i$...) |
| 20. | $D_n$(idx)←k | (stores k in $D_n$) |

Tables 3 and 4 below show an exemplary error-robust code-book and lookup table, respectively, generated using PROCEDURE 4 above:

TABLE 3 error-robust $C_4$ code-book

| $c_0$ | 0111 |
|---|---|
| idx | 1 |

TABLE 4 error-robust $D_4$ look-up table.

| code | idx |
|---|---|
| 00000 | 0 |
| 00001 | 0 |
| 00010 | 0 |
| 00011 | 1 |
| 00100 | 0 |
| 00101 | 1 |
| 00110 | 1 |
| 00111 | 1 |
| 01000 | 0 |
| 01001 | 1 |
| 01010 | 1 |
| 01011 | 1 |
| 01100 | 1 |
| 01101 | 1 |
| 01110 | 1 |
| 01111 | 1 |
| 10000 | 0 |
| 10001 | 0 |
| 10010 | 0 |
| 10011 | 1 |
| 10100 | 0 |
| 10101 | 0 |
| 10110 | 0 |
| 10111 | 1 |

TABLE 4-continued error-robust $D_4$ look-up table.

| code | idx |
|---|---|
| 11000 | 0 |
| 11001 | 1 |
| 11010 | 0 |
| 11011 | 1 |
| 11100 | 1 |
| 11101 | 1 |
| 11110 | 1 |
| 11111 | 0 |

The error-robust look-up table $D_n$ has $2^{(n+1)}$ entries because insertion errors created by duplicating bits, add an extra bit. The error-robust look-up table $D_4$, shown in Table 4, is a union over the three error variants. For example, the code 11110 corresponds to a bit insertion error onto 1110. Similarly, the code 00011 may be a bit flip error on the code-word 1011 or a deletion error on the code-word 0111. Encoding via $C_4$, shown in Table 3, is similar to PROCEDURE 2 described above with respect to Table 1.

Decoding may be performed in a manner similar to that described above with respect to Table 2, while taking advantage of the redundancy available in the look-up Table 4.

It may be appreciated that although the encoding/decoding schemes described above relate to binary codes, the principle may be scaled up to non-binary codes as well.

Beacons 100 may emit cyclic code bit streams in any suitable manner or format, depending on specific use and environment. For example, beacon 100 may emit pulses of having multiple hues, such that each value of the bits of the bit streams is represented by one of the multiple hues.

Figure 7:
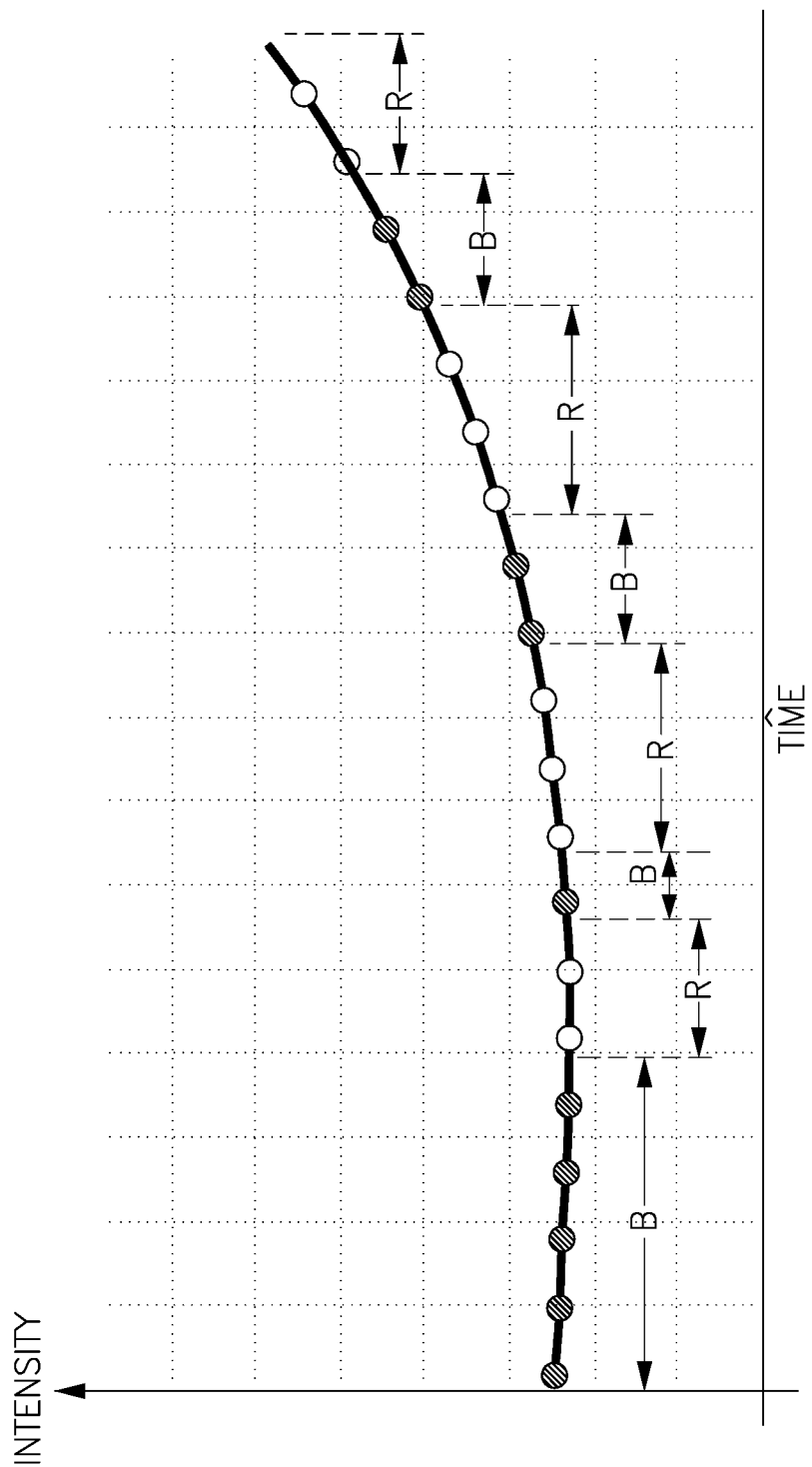
FIG. 7 shows a graph of received encoded signal intensities with respect to time for hue based coding, in accordance with an embodiment.

Referring to FIG. 7, an exemplary hue-based cyclic code is shown as a series of visible light pulses of different hues. The circles indicate the points that are sampled, and the ranges marked by the letters "R" (red) and "B" (blue) indicate the broadcast hues, red and blue, respectively. When using a hue-based coding scheme, the detected intensity may be used to determine the location and/or existence of a signal. The hue may then be used to determine the actual bit values of the detected codes.

Alternatively, beacons 100 may emit pulses of multiple brightness or intensity levels, such that each value of the bits of the bit streams is represented by one of the multiple intensities.

Figure 8:
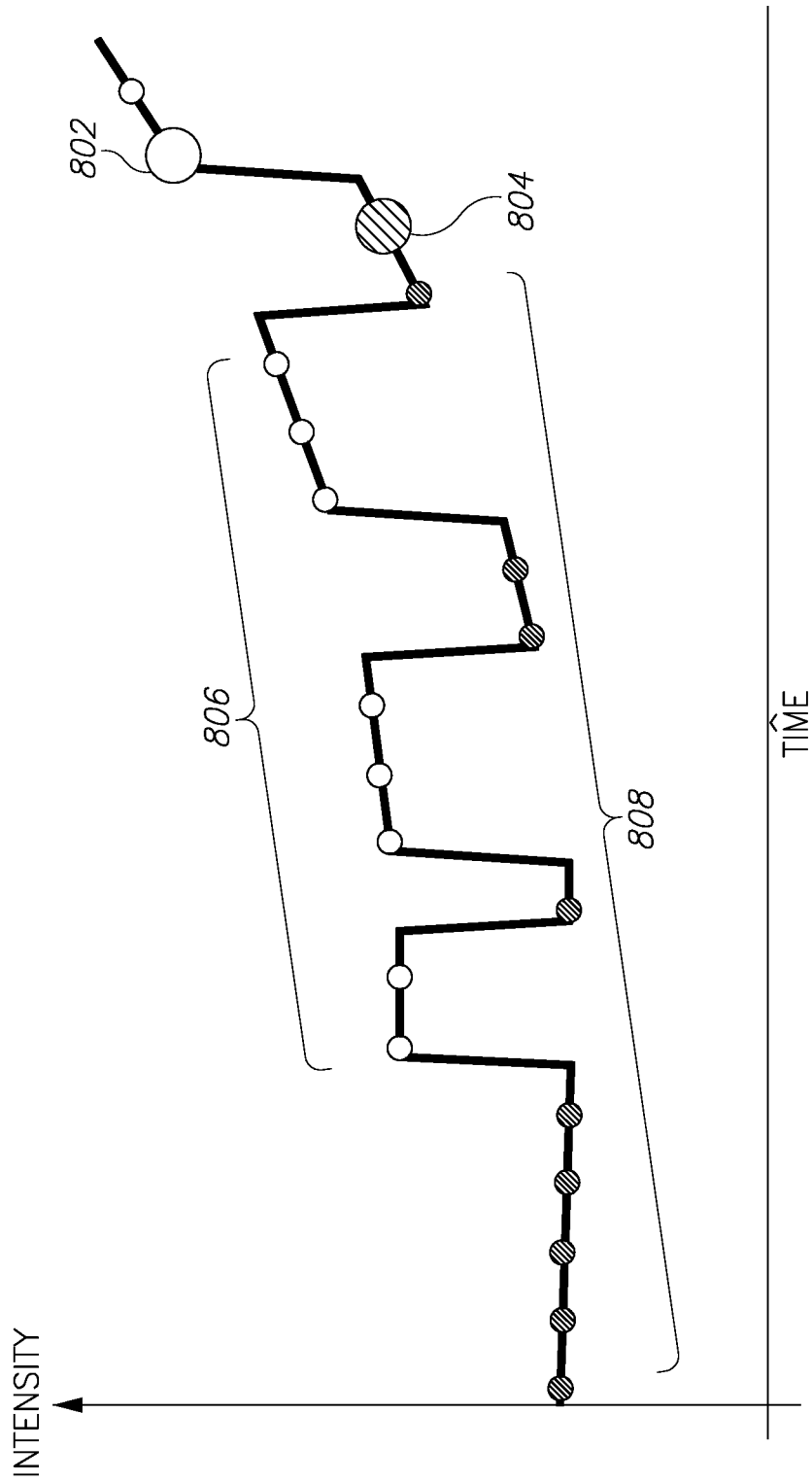
FIG. 8 shows a graph of received encoded signal intensities with respect to time for intensity based coding, in accordance with an embodiment.

Referring to FIG. 8, an exemplary intensity-based cyclic code is shown as a series of pulses having low and high intensities in the visible or near infrared frequencies, to produce a low-high brightness cyclic codes. The circles indicate the sampled points. The intensity levels directly encode the bit values. However, the intensity can also be impacted by distance and additional factors. To overcome this ambiguity, the maximum difference between detected intensities is determined, as indicated by the large circles 802 and 804 in the previous N bits. This maximum difference may then be used to seed the values for the remaining samples, indicated by the small white circles 806, and small dark circles 808.

To implement the hue-based signals, the bit value of each flash from a beacon 100 may be determined based on the hue of each flash detected by detector 104. For example, referring to FIG. 7, the HSV color space may be used to distinguish blue from red pulses. Portions of the curve marked 'B' indicate blue pulses, and curve portions marked 'R' indicate red pulses. Intensity is shown as increasing over time, possibly due to the position of tracking unit 102 with respect to beacons 100. As stated above, additional hues may be added to upscale the coding to non-binary codes. Non-binary codes may be advantageous when using visible light since transitioning between colors may be adapted to be more visually pleasing, and therefore less intrusive in the environment.

To implement intensity-based signals, for near-visible illumination, 2nd order polynomials were found as reasonable approximations for changes in intensity over a number of consecutive frames. Deciding a bit value based on whether it is above or below the polynomial line is then a reasonable conversion process. However, when the polynomial intersects with the intensity graph the conversion may fail. Thus, the intensity of the previously associated sequence of flashes may be used to calibrate the high and low values to correspond to 0 and 1 bits, respectively, noting that that every code has at least one high pulse and one low pulse (the trivial codes of all 0's and all 1's were removed from the code book), and thus a transition is guaranteed.

However, the size of the intensity change that represents a true bit transition is not known. Thus, initially, the largest point to point transition in the last n bits is found. Each of the points is then classified as being either a high pulse or a low pulse, based on its occurring either before or after the transition, and whether the transition is positive or negative. Using these values as seeds one may move from point to point, outward along the sequence. If the change between consecutive points passes a threshold, such as 40%, the value of the largest transition may be counted as a transition. An illustration of this is shown in FIG. 8.

In order to correctly and consistently identify brightness levels at different distances and in different lighting environments, detector 104 may be set to have a fixed contrast and exposure set for all images captured for a given tracking session.

Clock drift is a common problem with systems that use separate clocks and do not have a synchronization line to physically transfer clock signals. The result of clock drift is that two systems that are initialized at the same instant in time will quickly drift apart in their measurement of the passing of time. The effect of this is to cause bit-drift in data transmission between such systems. Synchronization protocols to overcome this drift are often a critical part of such system design. In contrast, tracking unit 102 and beacons 100 may operate without a common clock signal, using the novel binary codes described above. These codes enable simplex transmission and decoding of unique, repeated, cyclic beacon identifying signals, while being robust to single insertion/deletion and bit flip (IDF) errors per code.

Optionally, an additional 'heartbeat' signal, such as may be implemented either by radio, IR, or wire signal transmission, may be used to further reduce IDF errors and provide a system wide mechanism to determine when to continue operation and when to enter a sleep state. Thus, the system described herein may operate in two modes: synchronized and unsynchronized.

Figure 9:
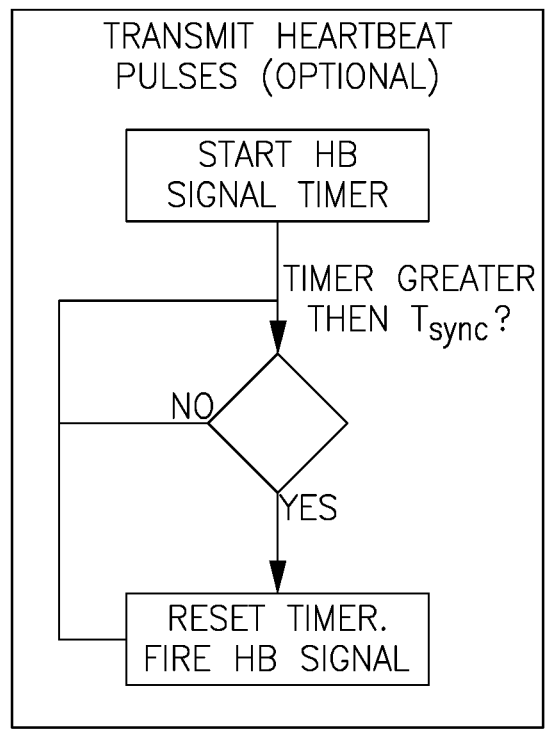
FIG. 9 shows a flow diagram for transmitting a synchronizing 'heartbeat' signal, in accordance with an embodiment.
Figure 10:
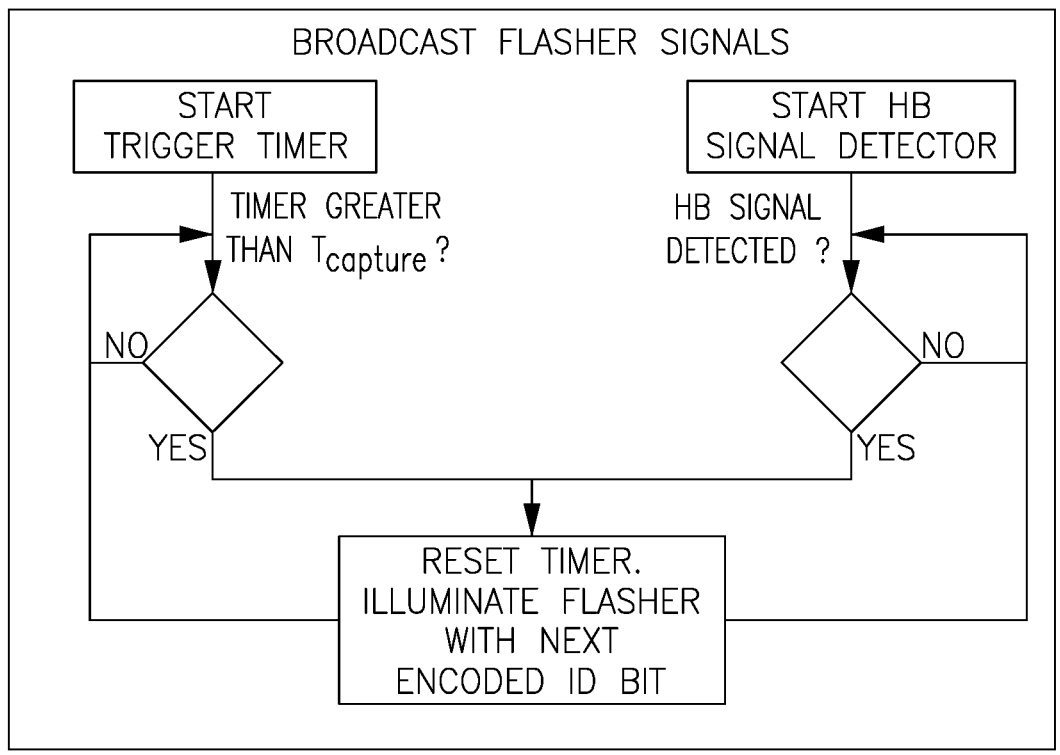
FIG. 10 shows a flow diagram for broadcasting an encoded signal by a beacon, in accordance with an embodiment.

For the synchronize mode, a synchronizing heartbeat unit 112 may broadcast a clock alignment signal, such as a simple binary pulse. Referring to FIG. 9, a flow diagram for transmitting a synchronizing signal by heartbeat unit 112 is shown. The clock alignment signal may be detected by a heartbeat receiver, such as may be radio, IR or wired receiver provided with each of beacons 100 and tracking unit 102. Each of tracking unit 102 and beacons 100 may use the detected clock alignment signal to synchronize an internal clock provided with each of tracking unit 102 and beacons 100, as shown in FIG. 10, thereby synchronizing the clocks of tracking unit 102 and beacons 100. This pulse can occur at any point, and is not used specifically as a clock signal but instead as a clock alignment signal. However, it may also be used as a clock signal if necessary. Thus, the heartbeat signal does not need to pulse frequently. To compute the minimum heartbeat pulse period, an upper bound on acceptable clock drift may be defined as $\delta_{max}$ seconds. Clocks typically have their drift rates p measured in parts per million (ppm). Thus knowing the maximum drift possible $\rho_{max}$ for all system clocks. the maximum synchronization pulse interval $\tau_{sync}$ sync may be determined as:

$$\tau_{sync} \leq \frac{\delta_{max}}{2\rho_{max}} \quad (1)$$

As mentioned, the heartbeat pulse serves a further purpose of informing beacons 100 that they should continue operating. In the case of fully wireless, battery powered beacons 100, this yields an effective energy saving scheme because they go into low power states when there is no heartbeat pulse. This enables beacons 100 to be completely standalone devices which are not physically tethered to each other or a central unit when used in a synched mode.

For the unsynchronized mode, no heartbeat unit is required, and thus beacons 100 and tracking unit 102 do not required additional circuitry to detect the heartbeat pulses. Although this leaves beacons 100 and tracking unit 102 susceptible to errors due to clock-drift, the error-robust encoding scheme described above may overcome these errors. In the unsynchronized mode, beacons 100 may be physically wired to an external long lasting power source, or be manually recharged since there is no sleep mode.

Beacons 100 may be distributed in an environment so as to effectively utilize the number of available identifiers Idx with code-words length N that can be generated. The identifiers may be reused in rooms and/or spaces that are visually separated from each other, such that a beacon with the same identifier will not be observed twice by detector 104. If a beacon 100 is observed twice within an image, such as if reflections on mirror surfaces are present, it may be ignored. Tracking unit 102 may automatically receive calibration information of a new beacon 100 in a new environment using any suitable means, such as via Bluetooth from room-specific transmitters as the tracking unit 102 moves from one area to another, for example, in a museum environment with multiple rooms or on a farm with multiple fields.

Each tracker unit 102 may retain an internal map of the different tracking environments obtained during the mapping, allowing different positional layouts of the same beacons 100 in different rooms/spaces to be used as an area specific indicator. The simplest way to implement this is to detect a large increase in Tracking error during the Tracker processing. This is a good indication of a Tracker having moved to a separate room/space. All the known mapping and calibration information for a particular environment can be used by the Tracker to determine which room in the environment best matches the layout of the Flashers identified by the Tracker. While setting up the Flashers in the environment it is also possible to choose to take advantage of the fact that two Flashers which are close to each other can be assigned codes with a large Levenshtein distance between them and two Flashers which are far from each-other and are unlikely to be observed at the same time may have similarly assigned codes. This process is used as an extra layer of robustness to improve the identifiability of Flasher IDs.

The codes used for generating the beacon identifiers are cyclic, allowing tracking unit 102 to identify a beacon 100 after receiving as few as n flashes, or bits, without having to wait for and identify a 'comma' delimiting code. The time to first identify a beacon 100 is the 'lock-on time'. The rate at which beacons 100 emit the encoded bits may be set to match the rate at which camera 104 samples the scene. If the emitting rate is high, then a high camera frame-rate is needed, placing additional processing load on processor 106. However, a higher frame-rate may result in a faster lock-on time. If many beacons 100 are needed, a large code-book is necessary, resulting in a longer code-word length, which negatively impacts the lock-on time. Thus, the trade-off is clear: high framerates are necessary for both fast lock-on time as well as longer code-words, while lower frame-rates are preferred in order to limit the processing requirements of processor 106. This trade-off can be seen in Table 5 below.

It may be seen also that once lock-on has occurred then as long as the detected beacon 100 remains tracked there is no additional time penalty for tracking. For a Virtual Reality (VR) application, a lock-on time of around 0.3s or less may be selected. Regular mobile phones with CMOS sensors can operate comfortably at 60 fps, thus for a mobile based VR application a code-word length of N=18 bits may be used, providing 83 code-words, some or all of which can be uploaded to beacons for use in a tracking scenario. For a fast moving drone application, one might consider a high framerate camera able to provide 180 fps with a desired lock-on time of 0.1s enabling up to 19 bits (138 code-words). Alternatively, a slow moving ground robot might only need to capture at 30 fps while still being able to use 21 bits or more if the necessary lock-on time is less than 1s.

TABLE 5

Table of lock-on times in seconds for code-book size versus sample frame-rate. Lock-on time is calculated as code-word length over frames per second.

|  | $30_{fps}$ | $45_{fps}$ | $60_{fps}$ | $75_{fps}$ | $90_{fps}$ | $120_{fps}$ | $180_{fps}$ | $240_{fps}$ |
|---|---|---|---|---|---|---|---|---|
| 7 → 2 | 0.23 | 0.15 | 0.11 | 0.09 | 0.07 | 0.05 | 0.03 | 0.02 |
| 8 → 3 | 0.26 | 0.17 | 0.13 | 0.10 | 0.08 | 0.06 | 0.04 | 0.03 |
| 9 → 4 | 0.30 | 0.20 | 0.15 | 0.12 | 0.10 | 0.07 | 0.05 | 0.03 |
| 10 → 5 | 0.33 | 0.22 | 0.16 | 0.13 | 0.11 | 0.08 | 0.05 | 0.04 |
| 11 → 6 | 0.36 | 0.24 | 0.18 | 0.14 | 0.12 | 0.09 | 0.06 | 0.04 |
| 12 → 8 | 0.40 | 0.26 | 0.20 | 0.16 | 0.13 | 0.10 | 0.06 | 0.05 |
| 13 → 12 | 0.43 | 0.28 | 0.21 | 0.17 | 0.14 | 0.10 | 0.07 | 0.05 |
| 14 → 15 | 0.46 | 0.31 | 0.23 | 0.18 | 0.15 | 0.11 | 0.07 | 0.05 |
| 15 → 25 | 0.50 | 0.33 | 0.25 | 0.20 | 0.16 | 0.12 | 0.08 | 0.06 |
| 16 → 35 | 0.53 | 0.35 | 0.26 | 0.21 | 0.17 | 0.13 | 0.08 | 0.06 |
| 17 → 52 | 0.56 | 0.37 | 0.28 | 0.22 | 0.18 | 0.14 | 0.09 | 0.07 |
| 18 → 83 | 0.60 | 0.40 | 0.30 | 0.24 | 0.20 | 0.15 | 0.10 | 0.07 |
| 19 → 138 | 0.63 | 0.42 | 0.31 | 0.25 | 0.21 | 0.15 | 0.10 | 0.07 |
| 20 → 231 | 0.66 | 0.44 | 0.33 | 0.26 | 0.22 | 0.16 | 0.11 | 0.08 |
| 21 → 376 | 0.70 | 0.46 | 0.35 | 0.28 | 0.23 | 0.17 | 0.11 | 0.08 |

Some possible applications for the tracking technique described herein include:

Virtual Reality goggle localization on mobile phone devices.

Mobile robot localization.

Drone localization over large land areas for accurate delivery and fly routes.

Wireless tracking for multiplayer systems.

Vehicle localization in warehouses.

Tool tip/controller localization.

In purely SLAM based systems lighting conditions and fast motion can completely wipe out the ability to detect and match feature points accurately. Because the described Flashers provide bright active light sources and are self-identifying (as opposed to natural feature points) they are more consistently detectable and trackable yielding a more robust localization system with little to no drift. Furthermore, they may be used to directly augment SLAM based systems by acting as consistent and known anchor points which are modeled without error. However, the system is primarily designed to be stand-alone without the need for full SLAM pipelines in order to ensure simple and fast processing. The invention thus enables full 6D tracking in almost general environments.

The computational burden on the processor 106 is minimal because detecting the beacons 100 per frame is not a computationally heavy process, and a simple implementation requires finding the center of mass of spots or bright points imaged by camera 104. This may be performed using energy efficient line-buffer based algorithms implemented in silicon.

Higher speed and resolution cameras and beacons may be used without changing the core structure of the technology, but immediately improving the lock-on time and positional accuracy. In other words, the technology scales well over time. Furthermore, the procedure to generate codes which are robust to drift are general and may be used to generate codes robust to additional errors, depending on the system requirements.

The system does not require a central processing station, and each tracker unit 102 may perform its own processing via its processor 106, removing the cumbersome need for wires and connection to beacons 100. In the synchronized version, the 'heartbeat' may merely serve as a drift offset pulse, without requiring a communication protocol. Even if the synchronized signal is lost for a period of time, the system will continue functioning. Additionally, in battery based beacons, the 'heartbeat' pulse may be used to determine whether or not the system should remain active. If no heartbeat is detected for a predetermined time, the system may enter a low power mode, saving energy and lengthening battery life. Additionally, an unwired system allows multiple users to move around the same environment simultaneously, and the environment size may be as large as necessary. To allow for larger tracking systems, either a larger area for flashing light sources, or brighter point sources may be required to ensure the beacons are visible to the camera.

Figure 11:
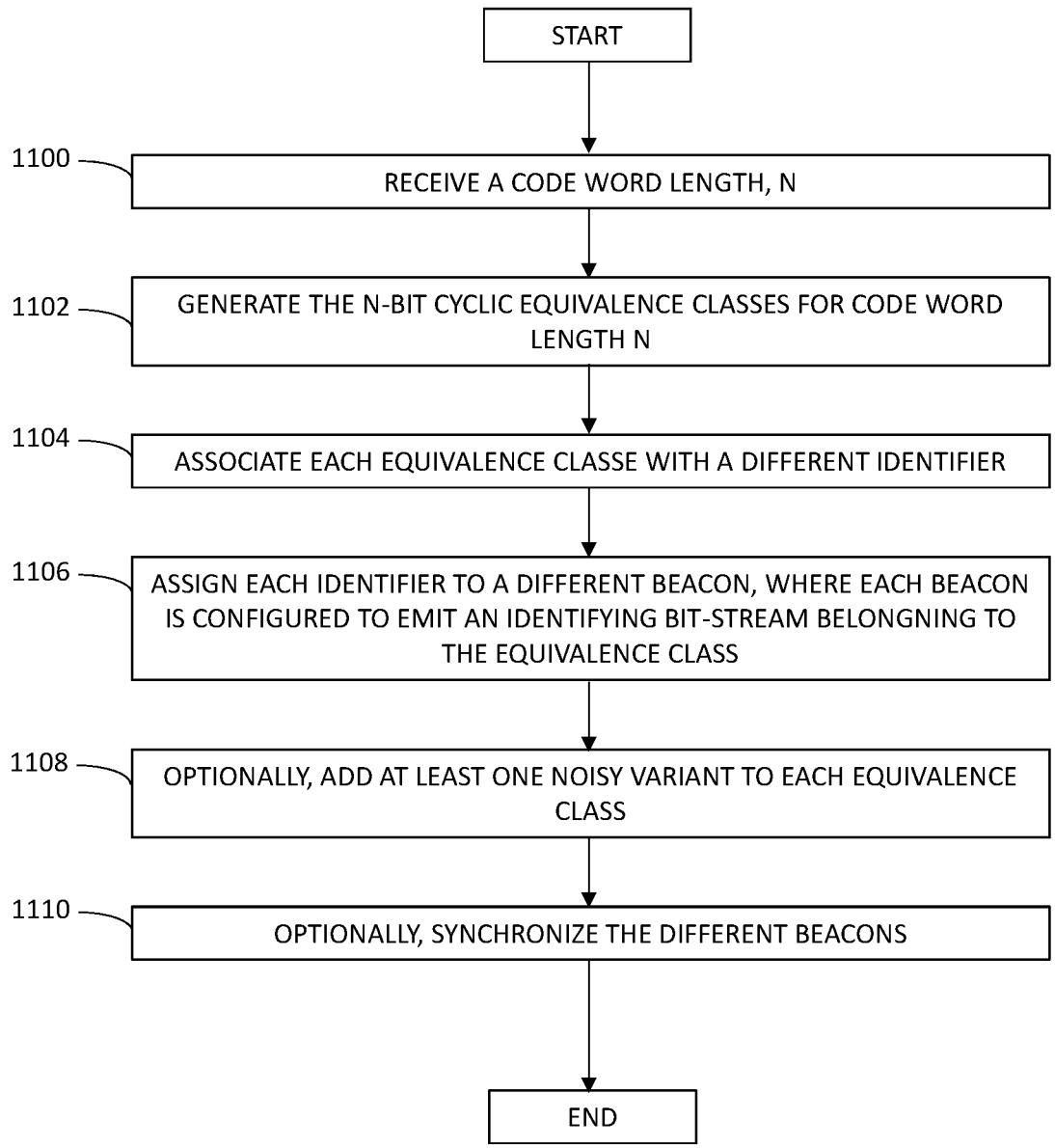
FIG. 11 shows a flowchart of a method for identifying multiple different signal sources which may be used for tracking purposes, in accordance with an embodiment.

Reference is now made to FIG. 11 which shows a flowchart of a method for identifying multiple different signal sources, such as beacons 100, which may be used for tracking purposes. A code-word length, n, may be received (Step 1100). For example, n may be selected to allow identifying beacons 100 in compliance with the constraints of the encoding schemes outlined above. The n-bit cyclic equivalence classes for the code-word length n may be generated (Step 1102). Each equivalence class may be associated with a different identifier, thereby associating each code-word of each cyclic equivalence class with the associated identifier (Step 1104). Each identifier may be assigned to a different signal source, such as one of beacons 100, configured to emit an identifying bit-stream belonging to the cyclic equivalence class associated with the assigned identifier (Step 1106). Optionally, the signal sources may emit the bit-stream using a hue-based encoding scheme, or an intensity-based encoding scheme. Optionally, only the non-trivial equivalence classes are assigned to an identifier, thus each beacon is associated with a non-trivial equivalence class. Optionally, at least one noisy variant may be added to each cyclic equivalence class (Step 1108). For example, the noisy variant may correspond to a bit insertion error, a bit deletion error, and/or one or more bit flip errors. Thus, the cyclic equivalence classes may be robust to these errors. Optionally, each of the signal sources may be synchronized using a clock alignment signal (Step 1110).

Figure 12:
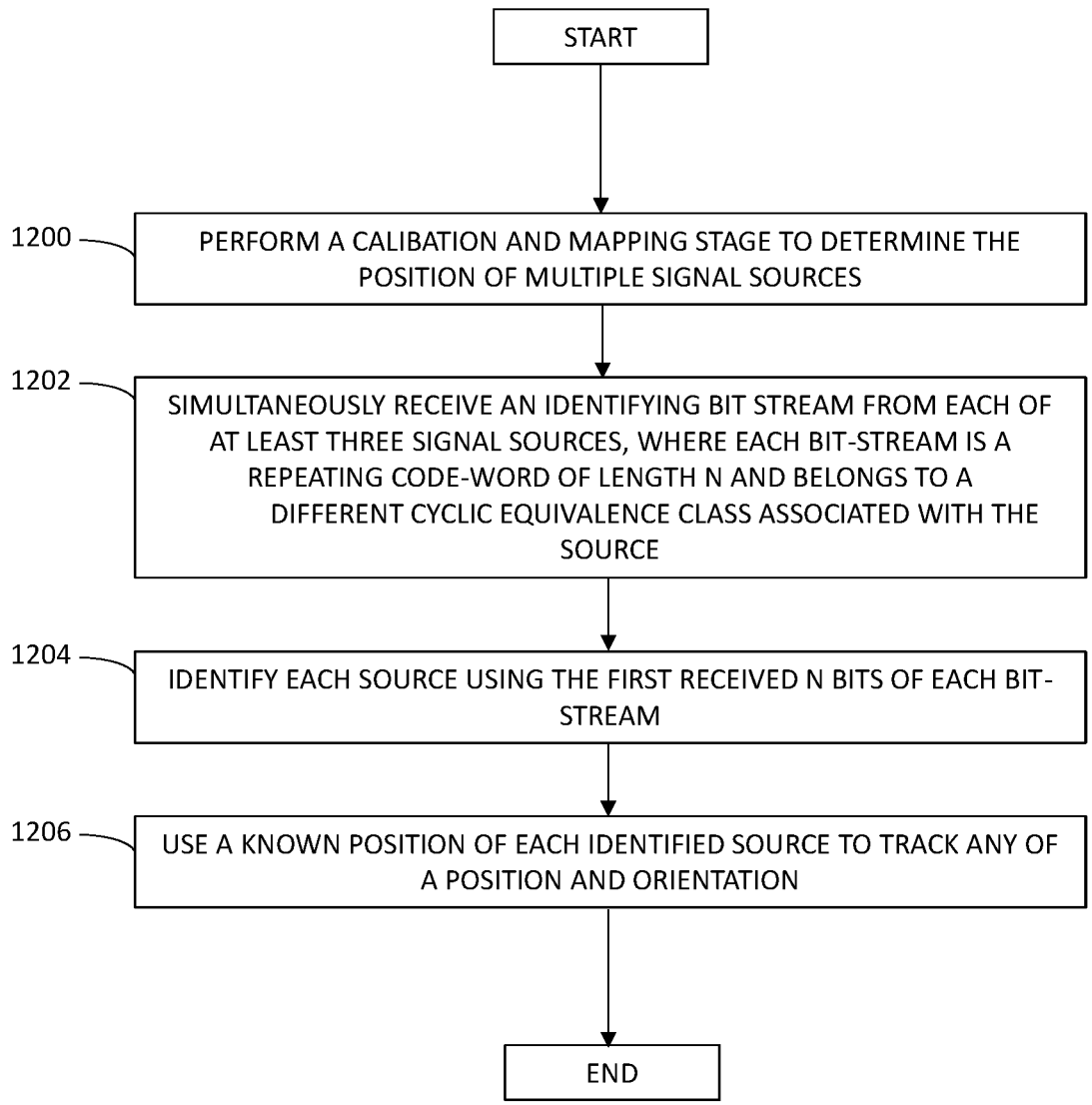
FIG. 12 shows a flowchart of a method for real-time tracking of any of a position and orientation, in accordance with an embodiment.

Reference is now made to FIG. 12 which shows a flowchart of a method for real-time tracking of any of a position and orientation, in accordance with an embodiment. A calibration and mapping stage may be performed to determine the positions of multiple signal sources (Step 1200). An identifying bit-stream may be simultaneously received from each of at least three different signal sources (Step 1202), where each bit-stream is a repeating code-word of length n, and where the code-word belongs to a different cyclic equivalence class associated with its signal source. The signal sources may be optic signal sources in the visible to infrared range, such as light beacons. The bit streams may be received as a stream of multiple two-dimensional images captured by a camera, and may be identified by identifying the brightest image points in a subsequently captured image of the image stream, and matching those points to similar bright points identified in a previously captured image of the stream of images, where a series of matched image points corresponds to one of the detected bit-streams. The bit-streams may be encoded using a hue-based encoding scheme, or alternatively, using an intensity-based encoding scheme, or any combination thereof.

Each signal source may be identified using the first received n bits of each bit-stream (Step 1204). A known position of each of the identified sources may be used to track any of a position and orientation (Step 1206). Optionally, each cyclic equivalence class may include at least one noisy variant code-word, such as may correspond to a bit insertion error, a bit deletion error, and/or one or more bit flip errors. The sources may either be synchronized, such as by receiving a shared clock alignment signal. Alternatively, the sources may be unsynchronized.

This system has low installation cost and low energy footprint, and is easily deployable. It may be adapted to different environments, and the non-synchronized version does not require direct signal communication. The system can be made to millimeter or sub-millimeter accuracy for small tracking spaces.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A tracking system, comprising:
   multiple beacons, each associated with a different cyclic equivalence class of code-word length n, and each configured to broadcast a bit-stream comprising a repeating code-word, wherein the code-word belongs to the associated cyclic equivalence class; and
   a mobile tracking unit comprising:
      a detector, and
      a processor,
   wherein the detector is configured to simultaneously detect at least some of the bit streams, and provide each sensed bit stream in real-time to the processor,
   wherein for each bit-stream received by the processor, the processor is configured to identify the beacon that broadcasted the bit-stream using the first n received bits, wherein said beacons and said mobile tracking unit are not synchronized with one another, and wherein a position of a first received bit of said first n received bit in said code-word is not known.

2. The system of claim 1, wherein the processor is further configured to determine any of a spatial position and an orientation of the tracking unit using a known position of each identified beacon.

3. The system of claim 2, wherein the processor is further configured to determine six degrees of freedom of the spatial position and the orientation of the tracking unit when the detector detects at least four non-coplanar bit-streams.

4. The system of claim 2, wherein the processor is further configured to determine multiple spatial positions and orientations over time, thereby tracking the tracker.

5. The system of claim 4, further comprising a simultaneous localization and mapping (SLAM) system, wherein any of the determined spatial positions and orientations are used to augment the SLAM system and provide drift-free tracking of the tracking unit.

6. The system of claim 1, wherein the cyclic code is robust to any of a bit insertion error, a single bit deletion error, and up to two bit-flip errors.

7. The system of claim 1, wherein the cyclic code is a binary code.

8. The system of claim 1, wherein each of the beacons is configured to emit the bit-stream using one of a hue-based encoding scheme and an intensity-based encoding scheme, and wherein the detector is an optical detector.

9. A method for identifying multiple signal sources, comprising:
receiving, by a detector of a mobile tracking unit, a code-word length n;
generating, by a processor of the mobile tracking unit the n-bit cyclic equivalence classes for the code-word length;
associating each equivalence class with a different identifier, thereby associating each code-word of each cyclic equivalence class with the associated identifier; and
assigning each identifier to a different signal source configured to emit an identifying bit-stream belonging to the cyclic equivalence class associated with the assigned identifier, wherein said signal sources and said mobile tracking unit are not synchronized with one another, and
wherein a position of a first received bit of said first n received bit in said code-word is not known.

10. The method of claim 9, wherein associating each equivalence class with the different identifier comprises associating the non-trivial equivalence classes with the different identifier.

11. The method of claim 9, further comprising adding at least one noisy variant to each cyclic equivalence class, wherein said noisy variant corresponds to one of a bit insertion error, a bit deletion error, and one or more bit flip errors.

12. The method of claim 9, wherein each signal source is configured to emit the bit-stream using one of a hue-based encoding scheme and an intensity-based encoding scheme.

13. The method of claim 9, further comprising synchronizing each of the signal sources using a clock alignment signal.

14. A tracking method, comprising:
simultaneously detecting, by a detector of a mobile tracking unit, a bit-stream from each of at least three different signal sources, wherein each bit-stream is a repeating code-word of length n, wherein each code-word belongs to a different cyclic equivalence class associated with its signal source;
identifying, by a processor of the mobile tracking unit, each source in real-time using the first received n bits of each bit-stream; and
using a known position of each of the at least three identified signal sources to track any of a position and orientation, wherein said signal sources and said mobile tracking unit are not synchronized with one another, and
wherein a position of a first received bit of said first n received bit in said code-word is not known.

15. The method of claim 14, wherein each cyclic equivalence class includes at least one noisy variant code-word, wherein said noisy variant code-word corresponds to one of a bit insertion error, a bit deletion error, and one or more bit flip errors.

16. The method of claim 14, wherein each of the bit streams is encoded using one of a hue-based encoding scheme and an intensity-based encoding scheme.

17. The method of claim 14, further comprising synchronizing each of the signal sources using a clock alignment signal.

18. The method of claim 14, further comprising determining the known positions of the signal sources in an initial calibration and mapping stage.

19. The method of claim 14, wherein simultaneously detecting the bit- streams comprises receiving a stream of multiple two-dimensional images, identifying the brightest image points in a subsequently captured image of the stream of images, and matching the brightest image points to similar brightest points identified in a previously captured image of the stream of images, wherein a series of matched image points corresponds to one of the detected bit-streams.

* * * * *